INVENTORS
Raymond W. Warren
BY Billy M. Horton
S. J. Rotondi, A. J. Dupont, F. E. McGee
& J. M. Presson INVENTORS
Raymond W. Warren
Billy M. Horton
BY S. J. Rotondi, A. J. Dupont,
F. E. McGee & J. M. Presson INVENTORS
Raymond W. Warren
Billy M. Horton
BY S. J. Rotondi, A. J. Dupont,
F. E. McGee & J. M. Presson INVENTORS
Raymond W. Warren
BY Billy M. Horton
S. J. Rotondi, A. J. Dupont, F. E. McGee
& J. M. Presson INVENTORS
Raymond W. Warren
Billy M. Horton
BY S. J. Rotondi, A. J. Dupont, F. E. McGee & J. M. Presson 3,107,850
FLUID LOGIC COMPONENTS
Raymond W. Warren, 2515 Seneca Ave., McLean, Va., and Billy M. Horton, 9712 Kensington Parkway, Kensington, Md.
Filed Mar. 17, 1961, Ser. No. 96,623
13 Claims. (Cl. 235—61)
(Granted under Title 35, U.S. Code (1952), sec. 266)

The invention described herein may be manufactured and used by or for the Government for governmental purposes without the payment to us of any royalty thereon.

This invention relates to pure fluid logic components capable of performing logic functions without moving parts.

Electronic logic components capable of performing the basic arithmetic functions of addition, subtraction, multiplication and division are conventional in the computer art. Such networks typically include "AND-NOT" and "OR-NOR" components which, when properly combined, accomplish the desired logic function of the counter or computer.

AND and OR circuits or components, such as vacuum tubes, are capable of producing an output signal which is a prescribed function of the input signal. In binary counters only two quantities or values are utilized in computing. These two values are designated 1 and 0, depending upon whether the input or output signal is present or absent, or whether an input or output signal has a higher or lower level than the other. The two-value basis is generally used in binary counters because the electronic logic components and circuits employed usually have but two states.

This invention is concerned with the AND-NOT, OR, and OR-NOR functions of fluid logic elements. In binary counters an AND function signifies a type of circuit whereby the output signal has a value of 1 only when both input signals are present, that is, when both input signals have value 1.

A NOT function in a binary counter system signifies a type of circuit which produces an output signal of value 1 when the input signal does not have a value, that is, when the value of the input signal is 0. NOT 1 in the two-value system would have the value of 0, while NOT 0 would have the value of 1, because if the input signal were not 0 the only other value it could have would be 1.

An OR component serves to indicate that the output value is 1 if either of the input values is 1. The OR function also includes the case where both of the input values are 1. The NOR function refers to the case wherein neither input signal has a value of 1.

Electronic computers can, of course, speedily perform all types of arithmetic functions. However, it is desirable that computing in general not be wholly dependent upon and limited to electronic systems, their components and power supplies. While mechanical systems employing liquids and gases have been developed which will perform functions somewhat analogous to those performed by existing electronic logic elements, such systems require large numbers of moving parts. Moving mechanical parts produce severe operating limitations because of friction, thermal expansion and wear. Also, mechanical systems are limited in some applications because of the weight and inertia of the moving parts. The response time of mechanical computers is quite long. Long response times result in low speeds of computing.

In assembling logic elements to provide adders, subtractors, multipliers and dividers in any kind of a computer, it is often necessary to stack and combine the various logic components. When the signal passes through a series of such components, however, there are power losses, causing the amplitude of the output signal to decrease. Thus, in an electronic computer, voltage and current amplification is required in order to perform complex operations. Achieving a power gain in a fluid computer has in the past required moving parts. These moving parts cause such computers to be slow in operation. Thus, there existed a need in the fluid computer art for achieving a power gain without moving parts so that the fluid computer elements could be stacked into complex arrangements and combinations and still function with a low response time.

It was discovered recently that a fluid-operated system having no moving parts could be constructed so as to provide a fluid amplifier in which the proportion of the total energy of a fluid stream delivered to an output orifice or utilization device is controlled by a further fluid stream of lesser total energy. These systems are generally referred to as "pure fluid amplifiers," since no moving parts are required for their functioning.

The fluid amplifier may be one which utilizes stream-interaction, or the amplifier may utilize boundary layer control. The following description is an aid in understanding some of the control principles involved in these two categories of fluid dynamic control systems.

In a stream interaction system, a first nozzle is supplied pressurized fluid and thereby issues a first jet, the "power stream." A second jet, a "control stream," supplied by a second nozzle, is directed against the side of the first jet to impinge against and deflect the first jet away from the second jet. If there is no splash or bounce of the fluid streams, momentum is conserved and the first jet will flow at an angle with respect to its original direction wherein the tangent of this angle is a function of the momentum of the second jet and the original momentum of the first jet. Thus, it is possible to direct a high power jet to a receiving aperture system using a lower power second jet. This constitutes an amplifier in the conventional sense, since it gives a power gain. When two or more control streams are used, impinging streams of the same total pressure level can be given different weighting or levels of effectiveness by varying the relative cross-sectional areas of the first and second nozzles. This weighting can also be varied by varying the velocity, density or direction of the control streams.

In wall interaction control fluid amplifiers, a first jet is directed towards a receiving aperture system by the pressure distribution in the first-jet wall region. This pressure distribution is controlled by the wall configuration of the interaction chamber, the first-jet energy level, the fluid transport characteristics, the back-loading of the amplifier outputs, and the flow of second-jet to the first-jet wall region. Whereas side walls are not essential for a stream interaction type fluid amplifier, a wall interaction control fluid amplifier generally uses side walls for aiding in the deflection of the first jet. In a wall interaction control fluid amplifier, special design of the interaction chamber provides an amplifier wherein the first jet will lock onto one side wall and remain in the locked-on flow configuration without fluid flow from the second nozzle.

As the fluid stream issues from the first jet, it entrains fluid in the jet interaction chamber. As fluid is entrained and removed by the first jet, the pressure along one chamber wall reduces. The particular wall along which the reduced pressure region occurs will depend upon the position of one chamber wall relative to the orifice of the first jet. When one chamber wall is positioned slightly closer to the orifice than the other, the pressure on the side of the fluid stream closest to the one chamber wall will be lower than on the side of the stream towards the other chamber wall because of the fact that the process of removing entrained fluid is more effective with respect to the one chamber wall than with respect to the other wall. As the pressure between the fluid stream and the one chamber wall decreases, the fluid stream moves closer towards that one chamber wall, and this movement produces a still further reduction in pressure as a result of entraining fluid between the wall and the stream. In wall interaction amplifiers, the fluid stream bends until it locks onto the one chamber wall and remains locked on until disturbed by additional fluid entering between the one chamber wall and the fluid stream.

The fluid amplifiers utilized in the components of the present invention control the delivery of energy of a first stream of fluid to an outlet orifice or utilization device by means of a second fluid flow issuing from a second nozzle generally at right angles to the first jet. The proportion of the relatively high energy main stream delivered to an orifice may be varied as a linear or nonlinear function of the relatively low energy of the stream interacting therewith. Since the energy controlled is larger than the controlling energy, an energy gain is realized. Such amplifiers require no moving parts and consequently have a response time considerably lower than prior art fluid systems which must employ moving parts.

The fluid logic components of this invention utilize the amplifying and quick-response capabilities of these fluid amplifiers. All parts comprising the logic components can remain stationary during operation thereof and only the fluid employed as the working fluid in the components moves.

Broadly, therefore, it is an object of this invention to provide a fluid system capable of performing logic functions with fluid streams.

More specifically, it is an object of this invention to provide a system utilizing interacting fluid streams to perform logic functions.

Another object of this invention is to provide a fluid system for performing logic functions with fluid streams which are guided in part by wall interaction effects.

Another object of this invention is to provide a system for performing logic functions with fluid streams wherein the system achieves a power gain during operation.

An important object of this invention is to provide a fluid system for performing logic functions in which there are no moving parts.

Still another object of this invention is to provide in combination a fluid amplifier for amplifying a plurality of fluid signals supplied thereto and a fluid directing means for preventing a certain type of signal from issuing from the amplifier when there is an absence of the required number of fluid input signals.

Yet another object is to provide an arrangement of two or more fluid logic components such that three or more fluid input signals can be detected and computed.

The specific nature of the invention, as well as other objects, uses, and advantages thereof, will clearly appear from the following description and from the accompanying drawing, in which.

The term "input signal" is defined as the fluid signal which is intentionally supplied to the fluid logic components for the purpose of instructing or commanding the component to provide a desired output signal. The term "output signal" used herein is the fluid signal which is produced by the fluid logic component. The input and output signals can be in the form of time or spatial variations in pressure, density, flow velocity, mass flow rate, fluid composition, transport properties, or other thermodynamic properties of the input fluid individually or in combination thereof. The term "fluid" as used herein includes compressible as well as incompressible fluids, fluid mixtures and fluid combinations.

Figures 1, 1A:
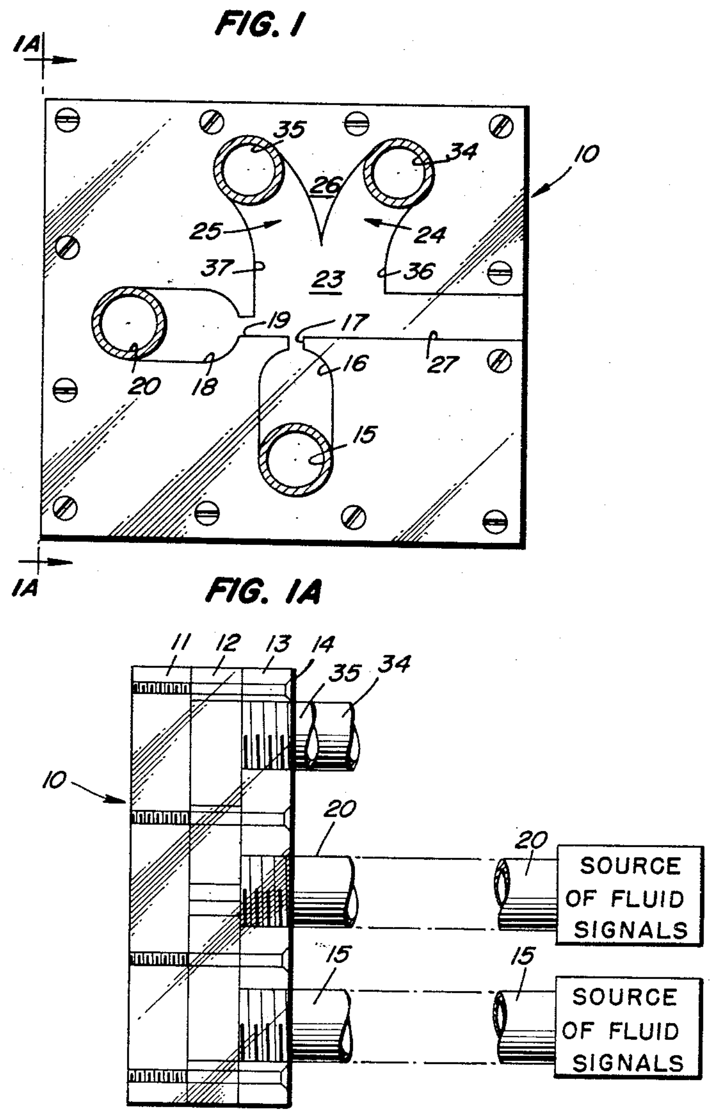
FIG. 1 illustrates a plan view of one embodiment of an AND-NOT fluid logic component constructed in accordance with this invention.
FIG. 1A is a side view of the embodiment shown in FIG. 1.

Referring now to FIG. 1A, AND-NOT fluid logic component 10 is composed of three flat plates 11, 12 and 13 secured together by screws 14 or other suitable means. For purposes of illustration, these plates are shown as composed of a clear plastic, although it will be evident that other materials, such as metal, may also be used.

Center plate 12 is cut in the configuration shown in FIG. 1 in order to provide a pair of input nozzles 16 and 18, a jet interaction chamber 23, apertures 24, 25 and 27. Input tubes 15 and 20 are threadedly secured in plate 13 and communicate with nozzles 16 and 18, respectively, and with sources of fluid input signals (not shown).

Nozzles 16 and 18 constitute the input nozzles of component 10 and communicate with jet interaction chamber 23 through orifices 17 and 19. The particular shape of orifices 17 and 19 is not critical and any conventional shape will suffice. Channel 27 is opposite orifice 19 so that unless the fluid stream issuing from input nozzle 18 is deflected by fluid issuing from input nozzle 16, this fluid will flow into channel 27 and spill out of component 10.

Chamber 23 is provided with chamber walls 36 and 37 which are set back so far from orifice 17 that the fluid issuing from this orifice will not lock onto either chamber wall. Deflection of the fluid streams from nozzles 16 and 18 is therefore achieved by stream interaction of two jets from nozzles 16 and 18. Divider 26 is capable of splitting fluid flow from chamber 23 into either aperture 24 or 25. Orifice 17 is asymmetrically positioned with respect to the apex of divider 26, as can be seen in FIG. 1, so that in the absence of a jet from nozzle 18 fluid issuing from nozzle 16 enters aperture 25.

Output tubes 34 and 35 are threadedly held in plate 13 and communicate with apertures 24 and 25 so as to receive fluid from these apertures. These tubes may be connected to suitable flow utilization devices or with other devices such as fluid operated computers which utilize the AND-NOT function of component 10. Fluid issuing from tube 34 provides an output AND signal, whereas fluid issuing from tube 35 provides an output NOT signal.

The AND function is achieved in component 10 because both input nozzles 16 and 18 must simultaneously receive an input signal of some predetermined magnitude before tube 34 will issue fluid. Since amplification is achieved, one input signal may have a considerably lower energy level than the other. Should the energy level of the input signal from nozzle 18 be too low to deflect the jet from nozzle 16 into aperture 24, the fluid jet issuing from nozzle 16 will enter aperture 25 and flow out NOT tube 35. In the absence of a fluid input signal from nozzle 16 the jet from nozzle 18 will spill out of component 10 by flowing through channel 27.

Thus flow from NOT tube 35 indicates that there are not two input signals of some predetermined energy level present at the same time in tubes 15 and 20. Only when the jet from nozzle 16 is deflected by an input signal of sufficient magnitude from nozzle 18 will the AND tube 35 receive enough fluid to indicate that there are present two simultaneous input signals having some predetermined level of energy.

Figure 2:
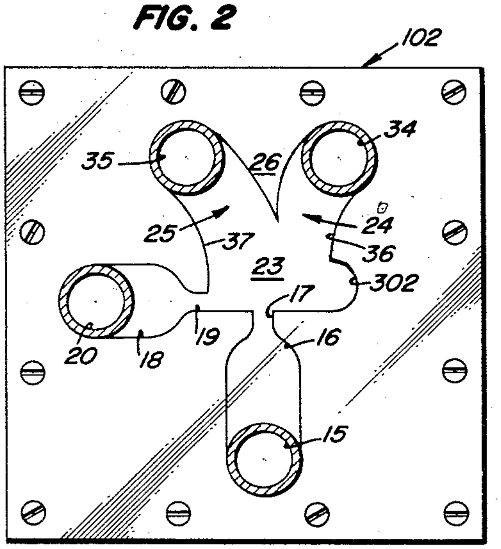
FIG. 2 is a plan view of another embodiment of an AND-NOT fluid logic component constructed in accordance with this invention.

FIG. 2 is another embodiment of an AND-NOT fluid logic component 102. In this embodiment, the tube spill-out aperture is eliminated and a curved section of chamber wall 302 is substituted therefor. In all other respects, the component is the same as component 10 shown in FIGS. 1 and 1A, and thus all parts have been designated by the same numerals. The elimination of the spill-out aperture can be effected since, in the absence of a deflecting jet from nozzle 16, the jet from nozzle 18 will impinge upon and be deflected by the curved shape of wall section 302. As a result, the stream enters aperture 25 and issues from tube 35 as a NOT signal. It will be evident that only when a fluid jet of some predetermined relationship of magnitude is simultaneously issuing from nozzles 16 and 18 will aperture 24 receive fluid flow. The chamber walls 36 and 37 are so far set back that the deflection of the streams in chamber 23 is solely by interaction of the intersecting streams from the input nozzles.

Figure 3:
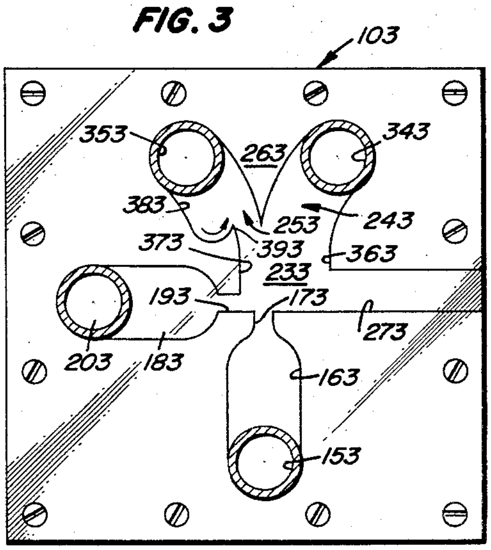
FIG. 3 is a plan view of another embodiment of an AND fluid logic component.

FIG. 3 illustrates another AND-NOT fluid logic component 103 which utilizes wall interaction rather than mutual stream interaction to function. In this component, wall lock-on is utilized to achieve the AND-NOT function. Component 103 consists of two input nozzles 163 and 183 and associated input tubes 153 and 203 which feed fluid input signals into respective input nozzles. Orifices 173 and 193 are formed by nozzles 163 and 183, respectively, and communicate with jet interaction chamber 233. Apertures 243, 253 and 273 also communicate with chamber 233, as shown. Output tubes 343 and 353 communicate with apertures 243 and 253. Tubes 343 and 353 are the AND and NOT output tubes, respectively, of component 103.

As the fluid stream issues from nozzle 163, it will entrain fluid in chamber 233. The fluid stream from nozzle 163 may be positioned closer to wall 373 than to wall 363, for example, by positioning nozzle 163 substantially closer to wall 373, inclining nozzle 163 toward wall 373, or by having orifice 173 slightly to the left of the tip of divider 263, as viewed in FIG. 3. Or, orifice 173 may be aligned with the apex of divider 263 as shown), since wall 363 is set back far enough from orifice 173 to prevent wall lock-on from occurring. As fluid issues from nozzle orifice 173 because wall 373 is closer to the stream than wall 363, the fluid will tend to evacuate the area between it and wall 373 faster than it evacuates the area between itself and wall 363. Thus the pressure on the side of the fluid stream toward wall 373 will be lower than on the side of the fluid stream toward wall 363. This difference in pressure causes the fluid jet from nozzle 163 to move toward wall 373 and the movement towards this wall causes a further reduction in pressure on the side of the fluid stream toward that wall. The stream bends until it locks onto this surface. The setback of wall 373 enhances the differential pressure effect. Fluid from nozzle 163 will never lock onto wall 363 because of the considerable setback of wall 363 from orifice 173.

In order to insure that the fluid flowing along wall 373 remains locked onto wall 373, wall 383 can be provided with sharp change of slope. The sharp changes of slope may take the form of a curved hook 393. Fluid vortices are created within the curved wall formed by the curved hook as fluid passes over hook 393. Vortices so created rotate as indicated by the arrows in FIG. 3 and aid in maintaining the reduced pressure between the wall 373 and the fluid stream flowing thereover. As the pressure in the region between the fluid stream and wall 373 decreases, the tendency of the fluid stream to remain locked onto wall 373 increases, as will be apparent. Consequently, in the absence of an input signal from nozzle 183 the jet from 173 flows along wall 373 into aperture 253 and out NOT tube 353.

The apex of divider 263 may be to the left (as viewed in FIG. 3) of orifice 173, because fluid from that orifice will lock onto wall 373. In such a case a fluid signal of relatively small magnitude from nozzle 183 will cause aperture 243 to receive fluid and thus AND component 103 is quite sensitive to fluid flow from nozzle 183.

Figure 4:
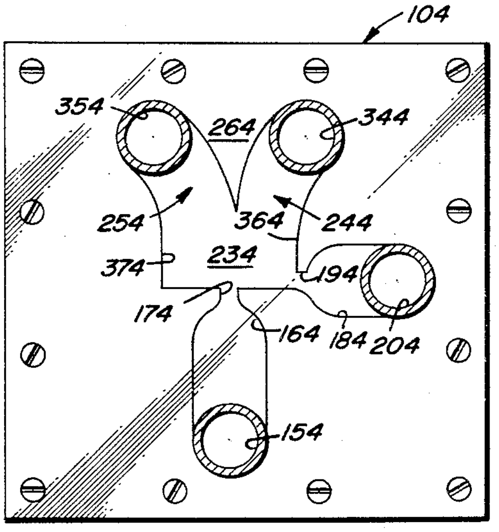
FIG. 4 is a plan view of another AND fluid logic component which is responsive to a vacuum input signal.

FIG. 4 illustrates another embodiment of an AND-NOT logic component which uses a vacuum input signal to deflect another input signal entering the interaction chamber at the same time or substantially the same time. Component 104 is provided with two nozzles 164 and 184 which communicate with jet interaction chamber 234 by means of orifices 174 and 194, respectively. The walls 364 and 374 of chamber 234 are set back so far from orifice 174 that fluid issuing from nozzle 164 will not lock onto either chamber and the deflection of the fluid from that nozzle results from stream interaction only. Divider 264 is positioned slightly to the right of orifice 174 so that in the absence of a vacuum in tube 204 and nozzle 184 fluid issuing from nozzle 164 enters aperture 254 and, hence, NOT tube 354.

Only where there is a substantially simultaneous vacuum across orifice 194 of sufficient magnitude to deflect the fluid stream from 174 into aperture 244 will AND tube 344 issue a signal. Thus, component 104 requires a positive input signal in tube 154 and a vacuum signal in tube 204 before the proper AND signal will issue from the component.

Figure 5:
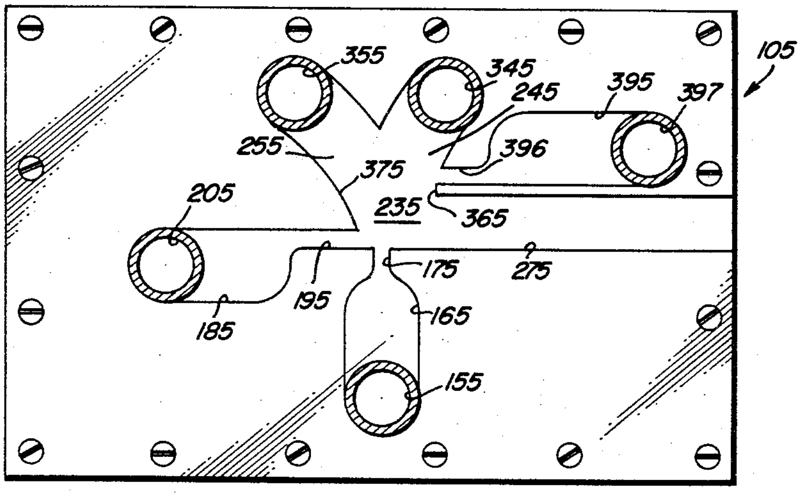
FIG. 5 is a plan view of another embodiment of an AND-NOT fluid logic component.

Component 105 (FIG. 5) consists of three input nozzles 165, 185 and 395 and associated input tubes 155, 205 and 397 which feed fluid input signals into respective input nozzles. Orifices 175, 195 and 396 are formed by nozzles 165, 185 and 395, respectively, and communicate with jet interaction chamber 235. Apertures 245 and 255 also communicate with jet interaction chamber 235, as shown. Output tubes 345 and 355 communicate with apertures 245 and 255. Porous plugs (not shown) may be inserted into tubes 345 and 355, if necessary, to provide proper backloading of the AND-NOT component.

As the fluid stream issues from nozzle 165 it will entrain fluid in chamber 235. The fluid stream from nozzle 165 may be positioned closer to wall 375 than to wall 365, for example, by positioning nozzle 165 substantially closer to wall 375, inclining nozzle 165 toward that wall, or by having orifice 175 slightly to the left of the apex of divider 265, as viewed in the figure. Or, orifice 175 may be positioned to the right of the tip of divider 265, since wall 375 is set back far enough from orifice 175 to prevent boundary layer lock-on from occurring. In accordance with any of the foregoing orifice and the wall positions or configurations, the pressure on the side of the fluid stream toward wall 375 will be lower than on the side of the fluid stream toward wall 365. This difference in pressure causes the fluid jet from nozzle 165 to move toward wall 375 and the movement towards this wall causes a further reduction in pressure on the side of the fluid stream toward that wall. The stream bends until finally it locks onto this surface. Fluid from nozzle 165 will not lock onto wall 365 because this wall is set back far enough from orifice 175 to prevent boundary layer lock-on from occurring.

As the pressure in the boundary layer between the fluid stream and the wall 375 decreases, the tendency of the fluid stream to remain locked onto that wall increases, as will be apparent. Consequently, in the absence of an input signal from nozzle 185, the stream from nozzle 165 flows along wall 375 into aperture 255 and out NOT tube 355.

If tube 155 does not receive a fluid signal while tube 205 is receiving such a signal, the jet from nozzle 185 enters aperture 275 and spills out this aperture since wall 375 is set back too far from orifice 195 to provide a surface upon which the stream can lock onto.

Fluid flowing into tube 205 issues as a jet from orifice 195. This jet supplies fluid to the boundary layer between wall 375 and the fluid stream from nozzle 165. Sufficient fluid must be supplied to the boundary layer to raise the pressure therein until the differential in pressure is no longer sufficient to hold the stream onto wall 375. As the magnitude of the input signal increases, the stream from nozzle 165 will be deflected to the right of chamber 235. Thus, the stream issuing from nozzle 165 will switch from aperture 255 into aperture 245 in the absence of flow from nozzle 395. Nozzle 395 is positioned to deflect the fluid stream into aperture 255 if tube 397 receives fluid. Thus, only if there is no flow into tube 397 will fluid issue from tube 355.

Figure 6:
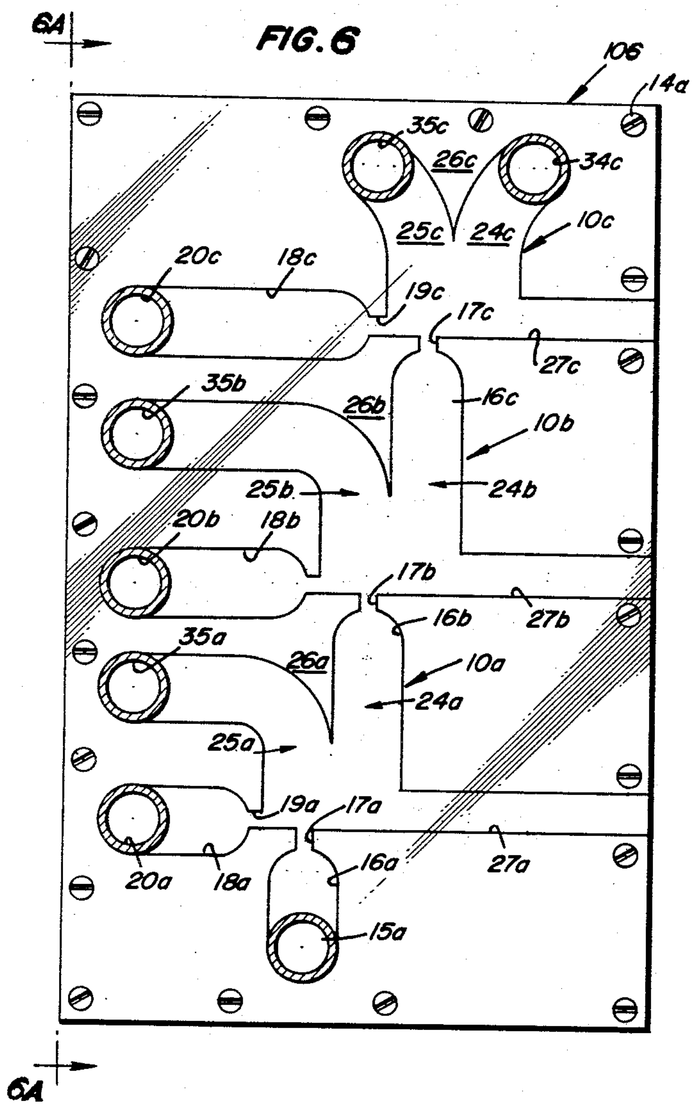
FIG. 6 is a plan view of a typical cascade of AND fluid logic components.
Figure 6A:
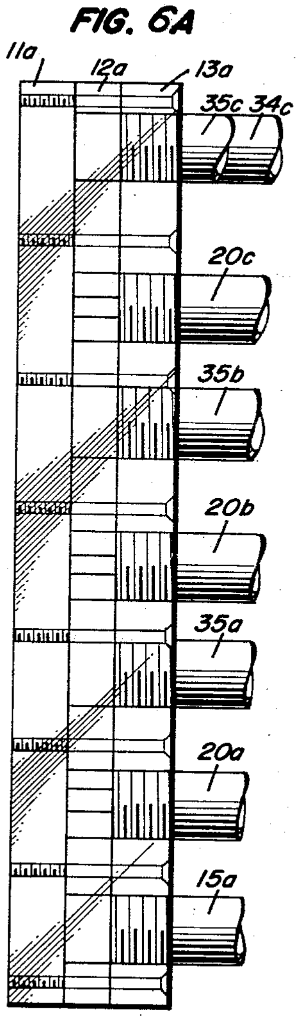
FIG. 6A is a side view of FIG. 6.

FIG. 6 illustrates a stacked arrangement of AND-NOT components of the type shown in FIG. 1. As shown in FIG. 6A, AND-NOT component 106 consists of three plates 11*a*, 12*a* and 13*a* secured together by screws 14*a*. Only plate 12*a* is cut into the configuration shown in this figure. Tubes 15*a*, 20*a*, 20*b*, 20*c*, 35*a*, 35*b*, 35*c* and 34*c* are threadedly fixed in plate 13*a* and communicate with their respective nozzles or apertures.

The basic AND-NOT components, designated by numerals 10*a* and 10*b*, differ from the component 10 described and illustrated in FIG. 1 only in that the AND tube is directly connected to one of the input nozzles of another component. Like numerals in FIGS. 1 and 5 refer to like elements. NOT tubes 35*a*, 35*b* and 35*c* will receive a fluid output signal when there is an absence of four input signals. Output tube 34*c* will issue an output signal when all four input signals of sufficient magnitude are received substantially simultaneously by component 104.

The operation of component 106 can be described as follows: If tubes 15*a* and 20*a* simultaneously receive a fluid input signal, nozzles 16*a* and 18*a* will convert the signal into jets which issue from orifices 17*a* and 19*a*. Impingement of the jet stream from orifice 19*a* upon the jet from 17*a* will deflect both streams into aperture 24*a* and ultimately into nozzle 16*b* where the fluid will issue as a jet from orifice 17*b*. If, at the time the jet issues from orifice 17*b*, a fluid signal is received by tube 20*b* such that nozzle 18*b* can deflect the fluid from nozzle 16*b* into aperture 24*b*, nozzle 16*c* will receive fluid and issue it as a jet from orifice 17*c*. Should there be a simultaneous issurance of fluid from orifice 19*c* as a result of tube 20*c* and nozzle 18*c* all receiving input signals, the combined streams will flow into aperture 24*c* and issue as an output AND signal from tube 34*c*.

Should there be an absence of an input signal in tube 20*a*, 20*b* or 20*c*, the asymmetric position of divider 26*a*, 26*b* or 26*c* will cause fluid issuing from either nozzle 16*a*, 16*b* or 16*c* to enter aperture 25*a*, 25*b* or 25*c*, respectively. Since an output signal from tube 35*a*, 35*b* or 35*c* indicates that there is an absence of an input signal in one of the component stages, it will be apparent to the utilization device that such a condition exists. Also, should there be an absence of an input signal from nozzle 16*a*, 16*b* or 16*c*, mutual stream impingement will not occur and aperture 27*a*, 27*b* or 27*c* will receive the fluid signal from nozzle 18*a*, 18*b* or 18*c*, respectively.

The logic produced by component 106 is summarized as follows: A fluid signal issues from tube 35*a* when a signal is applied to tube 15*a* and not to tube 18*a*, from 27*a* when fluid signals are supplied to 18*a*, not 15*a*; from 35*b* when an input signal is supplied to 15*a* and 18*a* but not 18*b*; from 35*c* when 15*a*, 18*a* and 18*b* but not 18*c* receives fluid; from 27*c* when 18*c* receives fluid but not 15*a*, 18*a* or 18*b*; and from 34*c* when 15*a*, 18*a*, 18*b* and 18*c* receive fluid input signals.

The AND-NOT components 102, 103, 104 or 105 may also be arranged and connected in the same manner.

The number of components in cascade will depend upon the number of input signals which are to be detected.

Figure 7:
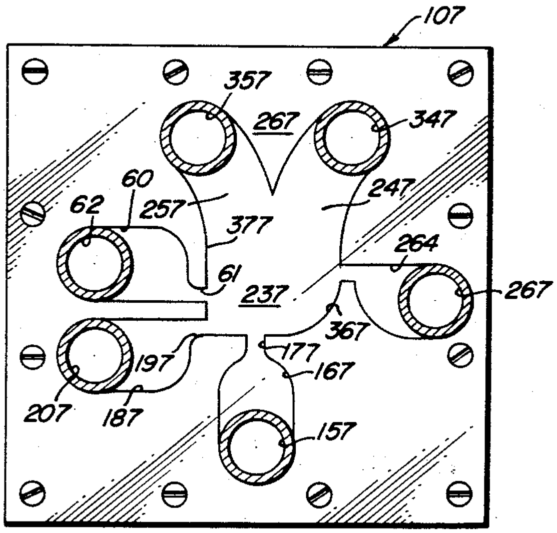
FIG. 7 is a plan view of one embodiment of an OR-NOR fluid logic component constructed in accordance with this invention.

FIG. 7 illustrates one embodiment of an OR-NOR fluid logic component 107. As can be seen from that figure, component 107 is similar to the AND-NOT fluid logic component 10 illustrated in FIG. 1, with the exception of the absence of spill-out aperture 27, and by the addition of nozzle 60 having an orifice 61 and an input tube 62. Divider 267 is asymmetrically located with respect to orifice 177 formed by nozzle 167 so that flow from orifice 177 enters tube 257 in the absence of other signals. Input nozzle 187, having an orifice 197 communicating with interaction chamber 237, and input nozzle 60, having an orifice 61 which communicates with the interaction chamber, are positioned at substantially right angles to input nozzle 167. Tube 357 and tube 347 provide respective NOR and OR indicating output tubes.

Chamber 237 is designed so that the nozzles communicating therewith provide fluid amplification by stream interaction. If continuous NOR signal is desired or required, orifice 177 must issue a stream continuously. If neither input tube 62 nor 207 receives an input signal, aperture 257 will receive fluid issuing from nozzle 167 because of the asymmetrical position of divider 267. Such fluid will provide a NOR output signal from tube 357. Should either or both input tubes 62 and 207 receive fluid input signals, the total fluid flow will enter aperture 247 and issue as an OR output signal from tube 347. Thus, the OR indication occurs only when either tube 62 or 207, or both, issue fluid input signals.

It is not essential that there also be an input to nozzle 167 to receive an OR output signal. By merely directing fluid so that nozzles 60 and 187 direct fluid flow into one aperture 247, there will be an OR output signal when either nozzle 60 or 247 issues fluid. Flow can be directed into OR aperture 247 by curving wall 367, as shown, so that fluid from these nozzles will be deflected into aperture 247.

Fluid component 107 may also act as a fluid inhibitor capable of performing functions analogous to conventional electrical inhibitor circuits. The inhibitor function can be accomplished by merely providing an additional nozzle, such as nozzle 264, in chamber wall 237. Input tube 267 supplies fluid to nozzle 264 so that the jet issuing from that nozzle can deflect by stream interaction fluid entering aperture 247 into aperture 257. Fluid will only enter aperture 247 when either tube 207 or 62 receives fluid, but not when tube 267 receives such a pulse. It will be apparent that by merely adding nozzle and tube connections to one side or the other of chamber 237, either output tube 347 or 357 can be made to receive fluid as a result of the occurrence or lack of occurrence of any number of input fluid signals supplied to the component.

Figure 8:
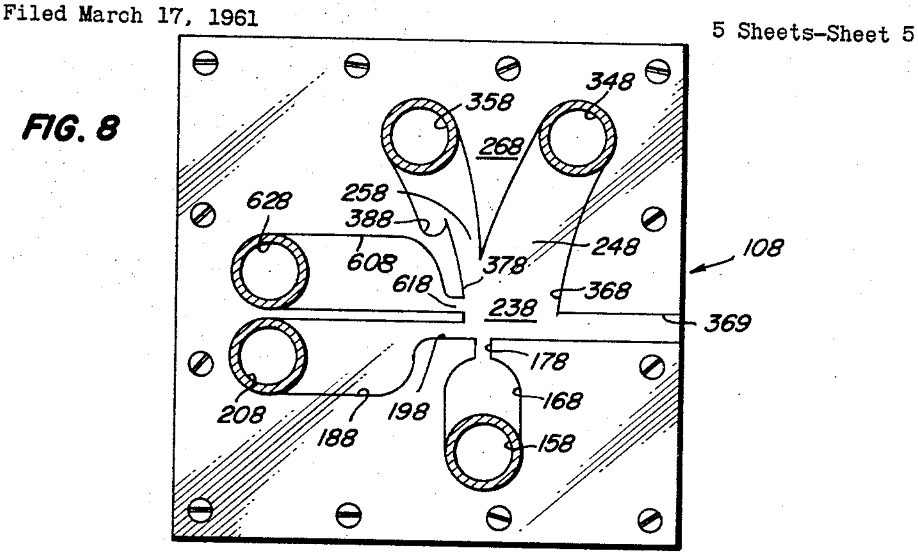
FIG. 8 is a plan view of another embodiment of an OR-NOR fluid logic component.

FIG. 8 illustrates another possible embodiment of an OR-NOR fluid logic component 108. This component is similar to component 103 illustrated in FIG. 3, and differs in that an additional control nozzle 618 and a passage 369 are provided.

Component 108 operates on the boundary layer control principle, since the chamber wall 378 is set back only slightly or has no setback and is provided with a curved wall portion 388 which develops a fluid vortex tending to maintain boundary layer lock-on. In operation, fluid will continuously issue from nozzle 178 as will be understood. In the absence of a fluid input signal supplied to either input tubes 208 or 628, all of the fluid flow from orifice 178 will lock onto wall 378 as a result of boundary layer lock-on, enter aperture 258 and flow from output tube 358, giving a NOR signal that neither input tube 208 nor 628 is flowing. Should either input tube 208 or input tube 628 receive a fluid signal which will issue as a jet from orifices 198 or 618, and if nozzle 168 is simultaneously issuing fluid from input tube 158, the boundary layer condition existing between wall 378 and the fluid stream from nozzle 168 will be disturbed. If the jet from either of the nozzles 608 or 188 has sufficient magnitude, it will eliminate the boundary layer lock-on allowing the stream to leave wall 378, enter aperture 248 and issue as an OR signal from output tube 348, indicating that either input tube 208 or 628 has received input signals of at least some predetermined magnitude. Obviously, if both input tubes 208 and 628 receive fluid signals at the same time, the stream will also be deflected into aperture 248.

When signal inputs from tubes 208 and 628 are removed, the stream would tend to remain issuing from aperture 248 if it were held to wall 368 by boundary layer lock-on. However, since passage 369 allows fluid to enter between the fluid stream and wall 368, it is not possible for the stream to lower pressure in this region. A boundary layer lock-on condition, therefore, cannot be established and the stream, in the absence of control signals, tends to issue along the center line of the nozzle. It then evacuates the region between the stream and wall 378 by entrainment. The lowered pressure developed by entrainment causes the stream to be deflected against wall 378, as previously explained.

Figure 9:
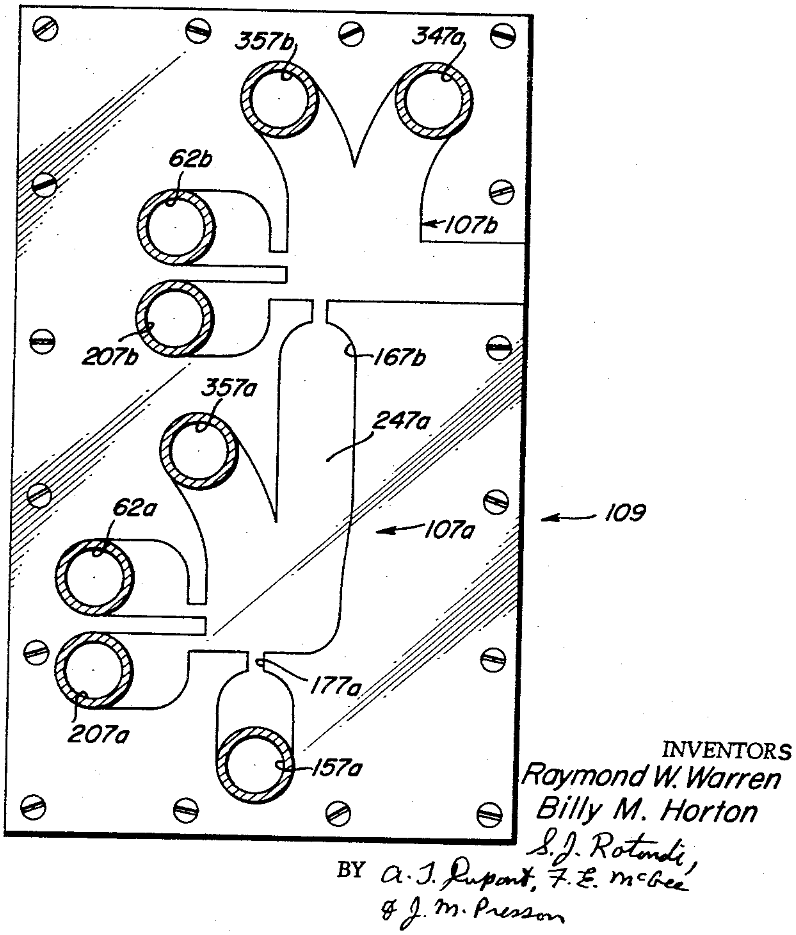
FIG. 9 is a plan view of a cascade of OR-NOR fluid logic components.

FIG. 9 illustrates a fluid logic component 109 which consists of a cascade of two fluid logic components of the type shown in FIG. 7. These components are referred to by numerals 107*a* and 107*b* and are connected together by merely extending aperture 247*a* into nozzle 167*b*, as shown. It will be evident that component 109 operates by stream interaction because the chamber walls are set back a considerable distance from the input orifice **177*a*** and 167*b*.

In operation, orifice 177*a* flows continuously. Output tube **357*a*** will receive a NOR fluid signal if neither input tube 207*a* or 62*a* receives fluid signals which can be converted into fluid jets by the nozzle shape. If either input tube 207*a* or 62*a* receives a fluid signal substantially simultaneously with a fluid signal received by tube 157*a*, deflection of the fluid stream will occur so that the stream enters aperture **247*a*** and flows into nozzle 167*b*. Thus, nozzle **167*b*** will receive a fluid signal from component 107*a* only if signals are received by input tube 207*a* or 62*a*. Similarly, tube 347*b* will issue a fluid signal only if input tube **207*b* or 62*b*** receives a fluid signal at the same time that the fluid is issuing from nozzle 167*b*. If neither input tube 62*b* or **207*b*** receives such a signal, tube 357*b* will receive the fluid from nozzle 167*b*.

Consequently, fluid issuing from tube 357*b* indicates that fluid has been received by either tube 62*a* or 207*a*, but not by input tube 62*b* or 207*b*. A fluid signal issuing from tube 347*b* indicates that a fluid input signal has been received by either tube 207*a* or 62*a* and by NEITHER tube 207*b* NOR 62*b*.

It will be evident that the various OR components shown in FIG. 8 may be substituted for the components shown in FIG. 7.

The logic from component 108 is summarized as follows: An output signal will issue from tube 347*a* when input signals are received by tubes 207*a* or 62*a* and 207*b* or 62*b*; from 357*b* when fluid signals are received by 207*a* or 62*a* nor 207*b* nor 62*b*; and from **357*a*** when fluid signals are received by 157*a* nor 207*a* nor 62*a*.

It will be evident that while a pair of input nozzles are shown in juxtaposition, the number of such nozzles employed will depend upon the number of input signals which are to be detected, as well as the type of logic which must be performed. By suitably positioning nozzles in the walls of the chamber of each component, the existence or presence of any number of conditions or events which will produce a fluid pulse signal may be computed. Also, the various AND–NOT, OR–NOR fluid logic components disclosed herein may be connected in any combination to effect the desired logic function.

Preferably, the fluid logic components of this invention should be designed so that a definite output signal is produced only when the input signals applied to the component are of some predetermined energy level. This will permit the component to either provide a definite output signal or none at all, depending upon the existence or absence of input signals of at least some preestablished magnitude. The particular energy levels involved or required will depend upon the particular design of the component, as will be evident to those skilled in the art.

It will also be evident to those in the art that deflecting walls, such as wall 302 in component 102, may be used in components of the boundary layer type. The vacuum signal can be also utilized in either type of amplifier to effect shifting or deflection of the fluid stream.

We claim as our invention:

1. A fluid logic component for performing an AND or NOT function comprising, a pair of nozzles adapted to issue fluid input signals as fluid streams or the like, a pair of tubes positioned to receive fluid from said nozzles, each of said nozzles being positioned for deflecting the streams of fluid from the other nozzle of said pair, one tube of said pair being positioned to receive the fluid stream from one nozzle of said pair in the absence of a deflecting fluid stream from the other nozzle, the other tube being positioned to receive the fluid stream which results from deflection of fluid streams issuing from both nozzles, and means preventing fluid from said other nozzle from entering said other tube of said pair in the absence of a deflecting fluid stream from said one nozzle.

2. The invention as claimed in claim 1, wherein a tube of a second fluid logic component is connected to said other output tube.

3. A fluid logic component for performing an AND or NOT logic function comprising, a fluid amplifier for amplifying a fluid input signal applied thereto, said fluid amplifier including first and second input means, said first and second input means being perpendicularly disposed, first and second jet issuing means, said first input means being connected to said first jet issuing means and said second input means being connected to said second jet fluid issuing means, a common chamber into which said jets are directed, first, second, and third output means, said first output means being positioned to receive said first jet stream when said second jet stream is inoperative, second output means to receive said second jet when said first jet means is inoperative, and third output means positioned to receive the jet stream caused by the simultaneous operation of said first and second input means.

4. The invention as claimed in claim 3 wherein said chamber is of such dimensions that the streams change their positions in response to mutual interaction.

5. The invention as claimed in claim 3 wherein said chamber in said fluid amplifier includes a wall located in proximity to one of the jet produced streams so that said stream is capable of locking on said wall in its movement toward one of said outputs.

6. A fluid logic element comprising a first means for issuing a first fluid stream, a second means for issuing a second fluid stream, a plurality of output means, means for directing said first stream to a first of said output means in the absence of a stream from said second means, means for directing said second stream to an output means in the absence of a stream from said first means, and means for directing a stream formed by the confluence of said first and second streams to an output means different from said first of said output means.

7. The combination in accordance with claim 6 wherein there is provided three output means and wherein said second stream is directed to a second output means and said combined first and second streams are directed to a third output means.

8. The combination in accordance with claim 6 wherein there are provided two output means, said second stream being divided to the said first of said output means.

9. The combination in accordance with claim 6 wherein said means for directing said first stream comprises aligning said first output means with said stream.

10. The combination in accordance with claim 6 wherein said means for directing said first stream comprises a wall extending from adjacent said first means for issuing said first stream toward said first output means, said wall having a surface closely adjacent the stream issued by said first means.

11. The combination in accordance with claim 6 comprising a third means for issuing a third stream and means for directing said third stream to the same output means as said first stream.

12. The combination in accordance with claim 6 comprising a third means for issuing a third stream and means for directing said third stream to the same output means as said second stream.

13. The combination in accordance with claim 12 further comprising means for directing said first stream to said output means different from said first output means in the presence of said second and said third stream and either one of said second and third streams.

References Cited in the file of this patent

UNITED STATES PATENTS

| | | |
|---|---|---|
| 2,889,856 | Magnuson | June 9, 1959 |
| 3,024,805 | Horton | Mar. 13, 1962 |

OTHER REFERENCES

"Pneumatic Computer Research in the USSR," Automatic Control, December 1960, pages 43–48.